United States Patent
Lam et al.

(10) Patent No.: US 11,323,963 B1
(45) Date of Patent: May 3, 2022

(54) OPTIMIZING BATTERY CONSUMPTION OF REMOTE END DEVICES ON A WIRELESS LONG-RANGE WIDE-AREA NETWORK (LORAWAN)

(71) Applicant: Hong Kong Applied Science and Technology Research Institute Company, Limited, Hong Kong (HK)

(72) Inventors: Tak Wing Lam, Hong Kong (HK); Chik Ki Yeung, Hong Kong (HK); Tak Fuk Wong, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 17/226,284

(22) Filed: Apr. 9, 2021

(51) Int. Cl.
*H04W 52/02* (2009.01)
*H04W 88/04* (2009.01)
*G06F 16/29* (2019.01)

(52) U.S. Cl.
CPC ........ *H04W 52/0222* (2013.01); *G06F 16/29* (2019.01); *H04W 88/04* (2013.01)

(58) Field of Classification Search
CPC .......................... H04W 52/0222; H04W 88/04
See application file for complete search history.

(56) References Cited

U.S. PATENT DOCUMENTS

| | | |
|---|---|---|
| 8,937,459 B2 | 1/2015 | Park et al. |
| 2019/0281554 A1 | 9/2019 | Nolan et al. |
| 2022/0043066 A1* | 2/2022 | Lloyd ................. G01R 31/374 |

FOREIGN PATENT DOCUMENTS

| | | |
|---|---|---|
| CN | 103281668 A | 9/2013 |
| CN | 107708186 A | 2/2018 |
| CN | 104837158 B | 5/2018 |
| CN | 108810813 A | 11/2018 |
| CN | 108882209 A | 11/2018 |
| CN | 109272728 A | 1/2019 |
| CN | 110062433 A | 7/2019 |
| CN | 110351818 A | 10/2019 |

OTHER PUBLICATIONS

ISR and Written Opinion, PCT/CN2021/087275, dated Dec. 31, 21.

* cited by examiner

*Primary Examiner* — Keith Ferguson
(74) *Attorney, Agent, or Firm* — Stuart T. Auvinen; gPatent LLC

(57) ABSTRACT

A long-range wireless network extends the battery life of the most remote end devices by forming pairs with a relayer end device that relays data from the remote end device to a gateway. The battery life of the relayer is reduced to extend the battery life of the remote end device. An analysis server selects pairs of end devices that have a difference in battery levels above a threshold, and require less transmission energy from the remote end device to the relayer than to the gateway. Energy or path losses are estimated based on geographic locations of end devices and terrain or obstacles. Redundant pairs from a remote end device are eliminated by selecting the relayer requiring the lowest transmission energy. A new configuration is sent to the remote end device. New configurations with higher Spreading Factors (SF) compensate for pairs with larger path losses to the relayer.

20 Claims, 16 Drawing Sheets

| DATA RATE | CONFIGURATION | PHY BITS/SEC |
|---|---|---|
| 0 | LoRa: SF12 / 125 kHz | 250 |
| 1 | LoRa: SF11 / 125 kHz | 440 |
| 2 | LoRa: SF10 / 125 kHz | 980 |
| 3 | LoRa: SF9 / 125 kHz | 1760 |
| 4 | LoRa: SF8 / 125 kHz | 3125 |
| 5 | LoRa: SF7 / 125 kHz | 5470 |
| 6 | LoRa: SF7 / 250 kHz | 11000 |
| 7 | FSK: 50 KBPS | 50000 |

FIG. 2

PRIOR ART

| END DEVICE | DATA RATE CONFIG, BATTERY USED | GEO. LOC. | BATTERY LEVEL |
|---|---|---|---|
| D14 | SF10/125KHZ, 1 mWh | LAT. LONG. ALT. | 30 % |
| D12 | SF7/250KHZ, 0.1 mWh | LAT. LONG. ALT. | 80 % |
| ... | ... | ... | ... |

FIG. 8

| PAIR ID | RELAYER END DEVICE | REDUCER END DEVICE | NEW REDUCER DATA RATE CONFIG, BATTERY USED | OLD REDUCER DATA RATE CONFIG, BATTERY USED |
|---|---|---|---|---|
| P1 | D12 | D14 | SF10/125KHZ, 0.25 mWh | SF12/125KHZ, 1 mWh |
| P2 | D57 | D88 | SF7/250KHZ, 0.1 mWh | SF11/125KHZ, 0.8 mWh |
| ... | ... | ... | ... | ... |

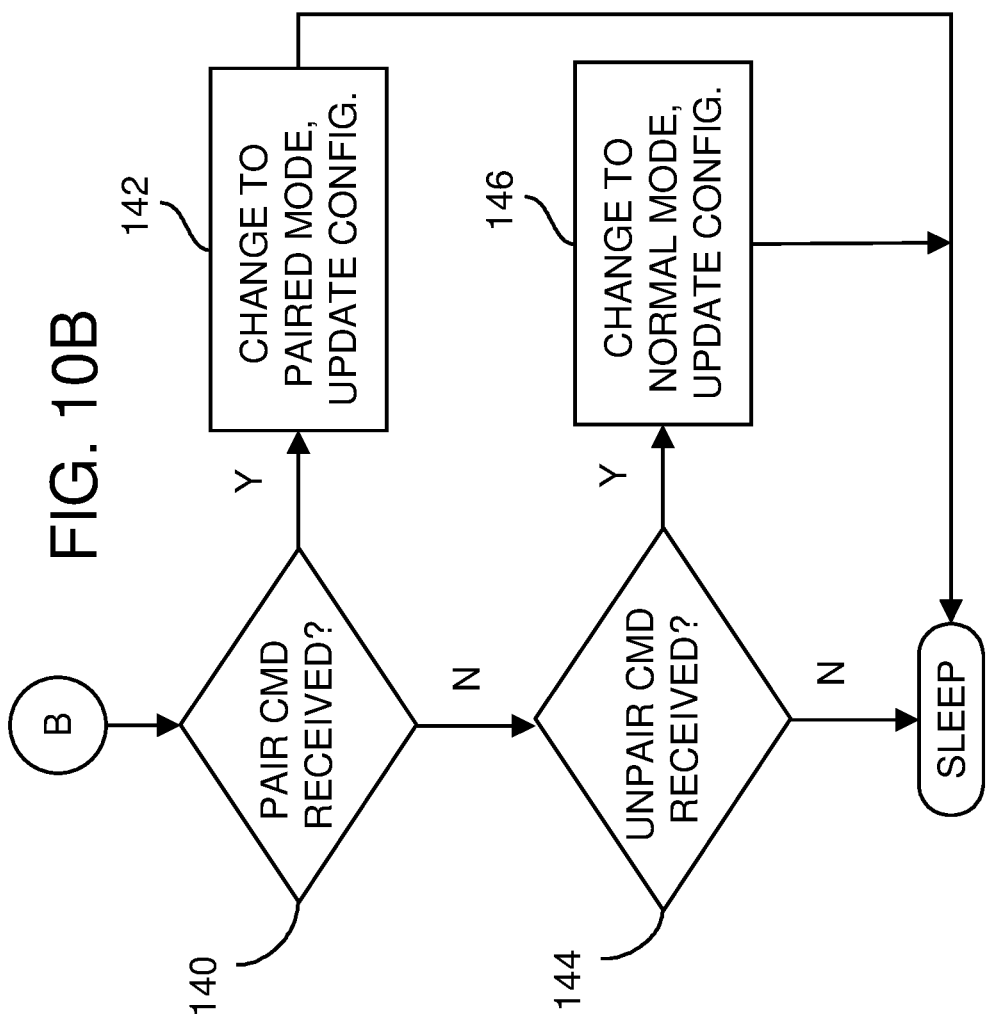

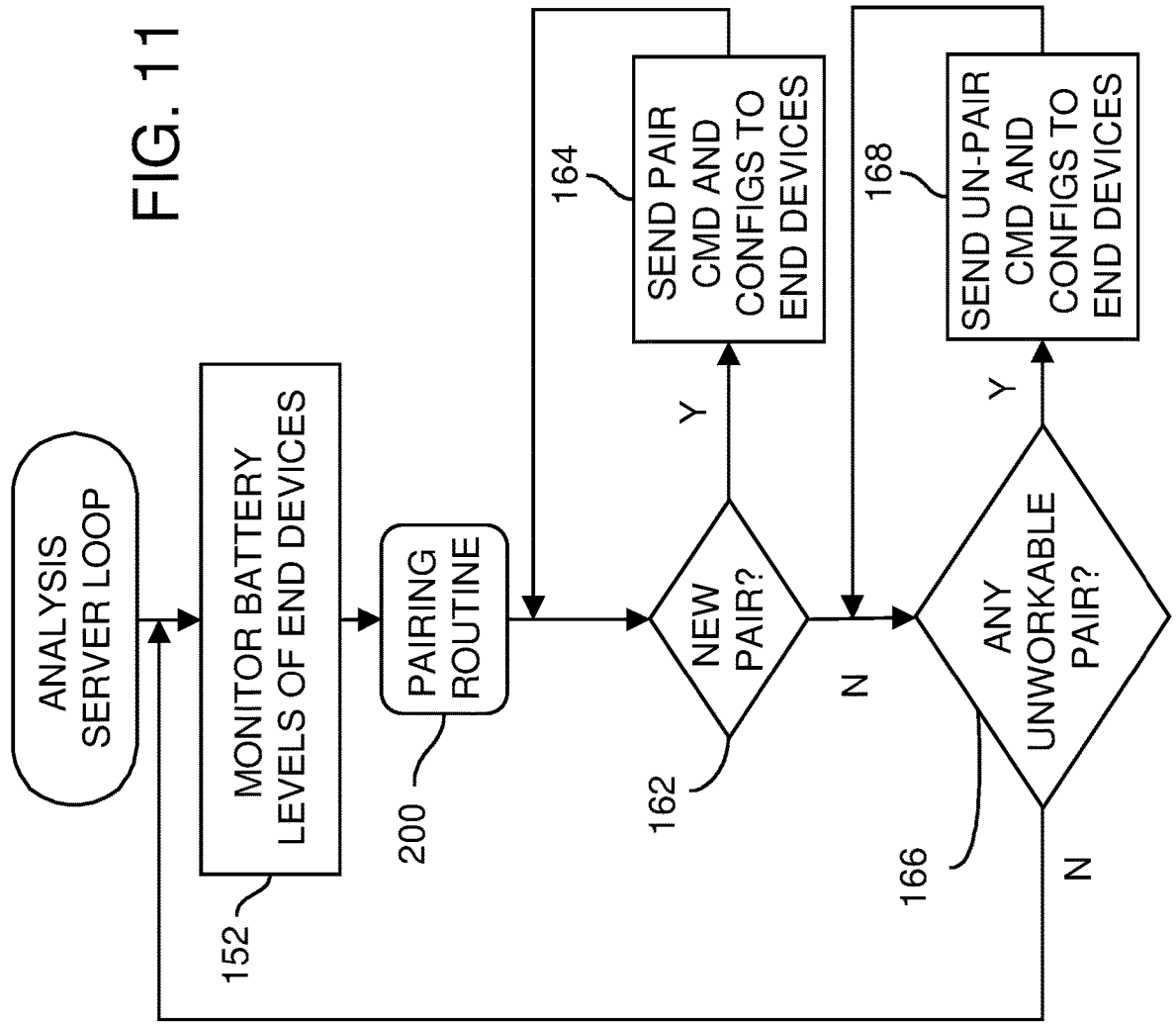

| DATA RATE (DR) | SF | CHIPS/SYMBOL | SNR LIMIT | BW (kHz) | RECEIVER SENSITIITY (dBm) |
|---|---|---|---|---|---|
| 6 | 7 | 128 | -7.5 | 250 | -121.52 |
| 5 | 7 | 128 | -7.5 | 125 | -124.53 |
| 4 | 8 | 256 | -10 | 125 | -127.03 |
| 3 | 9 | 512 | -12.5 | 125 | -129.53 |
| 2 | 10 | 1024 | -15 | 125 | -132.03 |
| 1 | 11 | 2048 | -17.5 | 125 | -134.53 |
| 0 | 12 | 4096 | -20 | 125 | -137.03 |

FIG. 13

| DATA RATE (DR) | SF | CHIPS/ SYMBOL | SNR LIMIT | BW (kHz) | RECEIVER SENSITIVITY (dBm) | AFFORDABLE PATH LOSS (dBm) |
|---|---|---|---|---|---|---|
| 6 | 7 | 128 | -7.5 | 250 | -121.52 | -142.52 |
| 5 | 7 | 128 | -7.5 | 125 | -124.53 | -145.53 |
| 4 | 8 | 256 | -10 | 125 | -127.03 | -148.03 |
| 3 | 9 | 512 | -12.5 | 125 | -129.53 | -150.53 |
| 2 | 10 | 1024 | -15 | 125 | -132.03 | -153.03 |
| 1 | 11 | 2048 | -17.5 | 125 | -134.53 | -155.53 |
| 0 | 12 | 4096 | -20 | 125 | -137.03 | -158.03 |

FIG. 14

OPTIMIZING BATTERY CONSUMPTION OF REMOTE END DEVICES ON A WIRELESS LONG-RANGE WIDE-AREA NETWORK (LORAWAN)

FIELD OF THE INVENTION

This invention relates to wireless networks, and more particularly to battery optimization of network end devices.

BACKGROUND OF THE INVENTION

Common wireless networks have ranges limited to under 100 meters for WiFi and a few meters for Bluetooth. Network standards such as LoRaWAN (Long Range Wide Area Network) may have a much wider geographical area, such as 5 km in an urban area, or 15 km in a rural area with fewer obstructions.

Wireless networks having battery-operated end devices are widely deployed. The end devices can be Internet-of-Things (IoT) devices having relatively low data needs, allowing a battery to power an end device for as long as a few years before the battery needs replacement or recharge. Long-range networks such as LoRaWAN can enhance IoT device power savings by using techniques such as chirp spread spectrum modulation.

FIG. 1 shows a prior art long-range network. End devices 10 are small battery-powered devices that communicate wirelessly with gateways 20. End devices 10 can monitor various appliances or systems. For example, end device 10 could be attached to a pet collar to track the pet and periodically send a data packet to gateway 20 with the pet's geographical location. End device 10 could be part of a smart trash can, periodically sending a data packet indicating if the can is full. Other end devices 10 could send water-meter reading data, smoke alarm status, or vending machine sales data, as just a few of many examples. There can be thousands of end devices 10 of many types and purposes. Each end device 10 may send data to gateway 20 only a few times per day, such as 10 time per day, thus reducing battery drain.

End devices 10 may be spread over a wide geographical area, such as 5 km in an urban area, or 15 km in a rural area with fewer obstructions. Several gateways 20 may be placed throughout a large area to provide better coverage. Gateways 20 can connect over backhaul network 18, such as cellular networks, Ethernet, or other network links to network server 22, which can access application server 24 over Internet 26.

Networks such as LoRaWAN can allow end devices to have adaptive data rates. End devices 10 that are physically closer to gateway 20 may use a higher data rate and may consume less energy, prolonging their battery life.

FIG. 2 is a table of data rates and configurations in a long range network. In this example, data can be transmitted from end device 10 to gateway 20 over a 125 kHz channel or over a 250 kHz channel for a higher data rate. Gateway 20 has no power limitations and can use a much higher 500 kHz channel when transmitting to end devices 10. Using low frequencies such as 125 kHz can lower power requirements since power amplifiers can have high efficiency for these low frequencies.

End devices 10 that are farther from gateway 20 or that have obstructions that cause Radio Frequency (RF) interference can use a larger Spreading Factor (SF) to reduce transmission errors. Higher Spreading Factors (SF) have a given symbol spread out over more chirps or groups of physical bits transmitted. Thus higher SF settings have more redundancy and are more robust for transmitting data over poor connections. However, the data rate is reduced for higher SF settings with the increased redundancy.

For example, data rate configuration 0 has a SF of 12 and transmits only 250 bps, while data rate configuration 4 has a SF of 8 and transmits 3125 bps. Close end devices 10 can support the highest data rate of 50,000 bps using Frequency Shift Keying (FSK) for data rate configuration 7. Based upon the strength of the received signal, network server 22 determines the optimal node data rate including the spreading factor. Network server 22 configures the data rate of the end devices through gateway 20, and other servers such as application server 24, can change the data rate of the end devices with the help of network server 22. Each end device 10 is configured to a specific data rate configuration based on factors such as the physical distance to the nearest gateway 20. The assigned configuration can be downgraded when data transmission errors surpass a threshold.

FIG. 3 shows a long range network. End devices 10 are physically located and different distances from gateway antenna 21 for gateway 20. End device 14 is farther from gateway antenna 21 than end device 12. End device 14 will require more energy to transmit a fixed amount of data to the gateway than does end device 12. This higher transmission energy will tend to deplete the battery of end device 14 faster than for end device 12. End device 14 may be expected to deplete its battery and fail or require battery replacement sooner than end device 12.

FIG. 4 is a graph of battery lifetime for a long range network. This histogram shows a wide range and dispersion of battery lifetimes in a long range network. Some end devices such as end device 12 are close to the gateway and require little energy to transmit data, so their batteries last as long as 10,000 or 11,000 days until battery depletion when battery replacement is needed. Other end devices such as end device 14 are far from the nearest gateway and require relatively larger amounts of energy to transmit data. These remote end devices may deplete their batteries in only 2,000 days. Such uneven battery consumption is undesirable.

Battery replacement can be an annoyance for end users when they discover that their end device is no longer functioning. Notices could be sent to end users when a battery is nearing depletion, or a service provider could send a technician out to replace the battery or the entire end device. Each service call is expensive. It would be better if all batteries needed replacement at about the same time, to reduce the frequency of expensive service calls or the annoyance of end users.

What is desired is to reduce early battery failures of remote end devices in a long range network. It is desired to spread battery usage over several end devices to extend the battery life of a remote end device. A long range network with transmission-energy load-balanced end devices is desired.

BRIEF DESCRIPTION OF THE DRAWINGS

FIG. 2 is a table of data rates and configurations in a long range network.

FIG. 8 shows entries in a network directory.

FIG. 9 shows entries in the configuration pair database.

FIGS. 10A-10B show a flowchart of operation of end devices.

FIG. 11 shows a maintenance loop executed by the analysis server.

FIG. 13 is a table for selecting a new data rate configuration for the reducer end device based on the path loss between the reducer and relayer end devices in a new pair.

FIG. 14 is an alternate table for selecting a new data rate configuration for the reducer end device based on the affordable path loss between the reducer and relayer end devices in a new pair.

DETAILED DESCRIPTION

The present invention relates to an improvement in network battery usage. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 5:
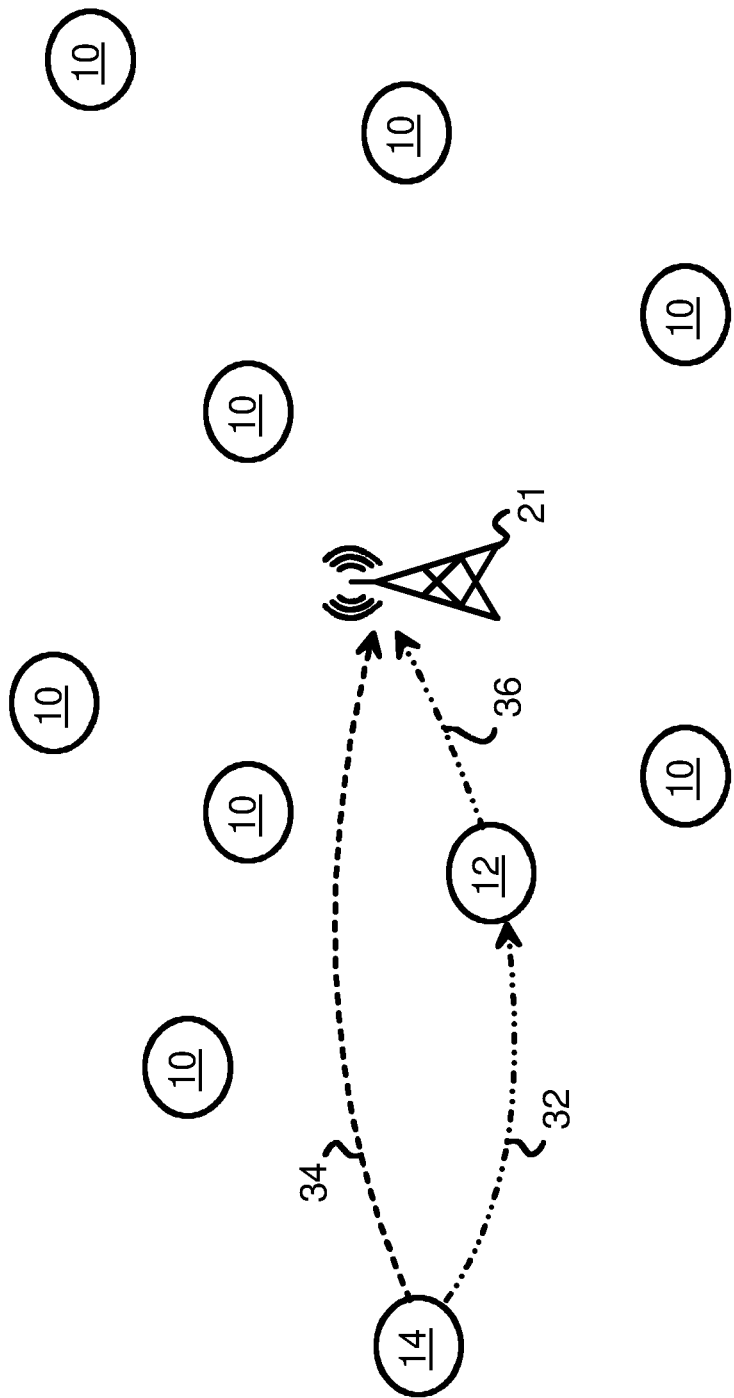
FIG. 5 shows transmission-energy sharing in a low-power long-range network.

FIG. 5 shows transmission-energy sharing in a low-power long-range network. End device 14 is relatively far from gateway antenna 21. A relatively large amount of energy is required of the battery of end device 14 to transmit data over long path 34 to gateway antenna 21. The RF signal from end device 14 may be too weak for a reliable connection to gateway antenna 21, so data may need to be re-sent, or sent with a higher spreading factor, increasing transmission energy consumption.

End device 12 is closer to gateway antenna 21 than is end device 14. End device 12 requires less battery energy to transmit data to gateway antenna 21 over short path 36 than end device 14 does to transmit the same data to gateway antenna 21 over long path 34.

The inventors have realized that long path 34 may be replaced by short path 32 and short path 36. Data from end device 14 can first be sent over short path 32 to end device 12, and then end device 12 can forward that data over short path 36 to gateway antenna 21. Since the energy required to transmit data over short path 32 is less than the energy require for long path 34, the energy consumed from the battery of end device 14 is reduced.

However, the energy consumed by end device 12 will increase, since end device 12 must send over short path 36 this extra data from end device 14. The energy consumption from end device 12 increases while the energy consumption from end device 14 decreases.

The battery loading is shifted from remote end device 14 to near end device 12. Less energy is consumed from the battery of end device 14 and more energy is consumed from the battery of end device 12. The battery life of end device 14 is extended and the battery life of end device 12 is reduced. Battery consumption is more evenly spread across end devices 12, 14.

Other more-remote end devices 10 can be identified and configured to send data to a closer end device 10 rather than directly to gateway antenna 21. Each pair of end devices can be configured to wake up at the same time. Overall, fewer end devices will have short battery lifetimes and fewer end devices will have very long battery lifetimes. The extremes in battery lifetime will have been reduced.

Figure 6:
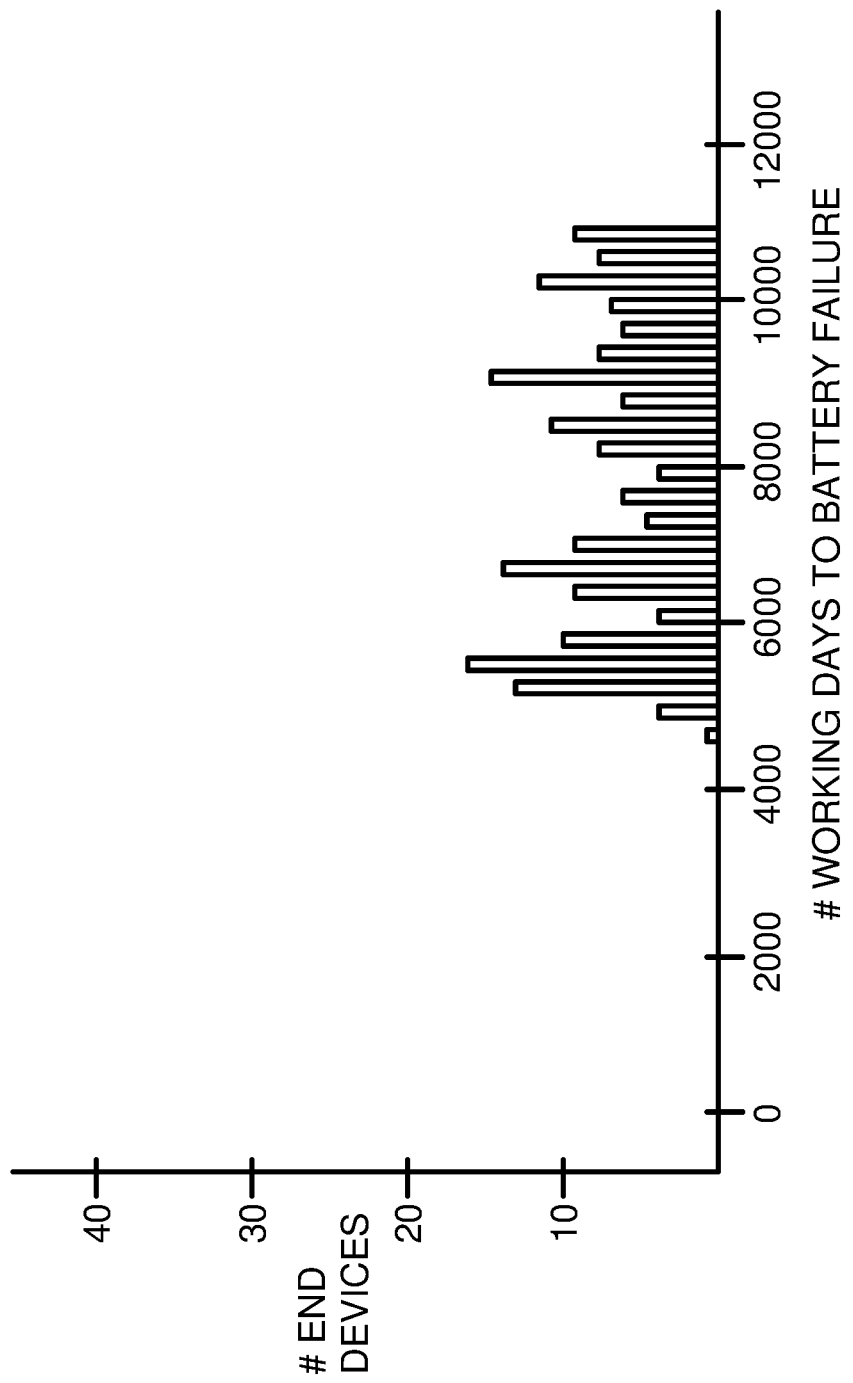
FIG. 6 is a graph of battery lifetime distribution for a long-range network with optimized battery consumption.

FIG. 6 is a graph of battery lifetime distribution for a long-range network with optimized battery consumption. In this histogram, most end devices have battery lifetimes of 5,000 to 11,000 days. Very few end devices have battery failures before 5,000 days.

Figure 1:
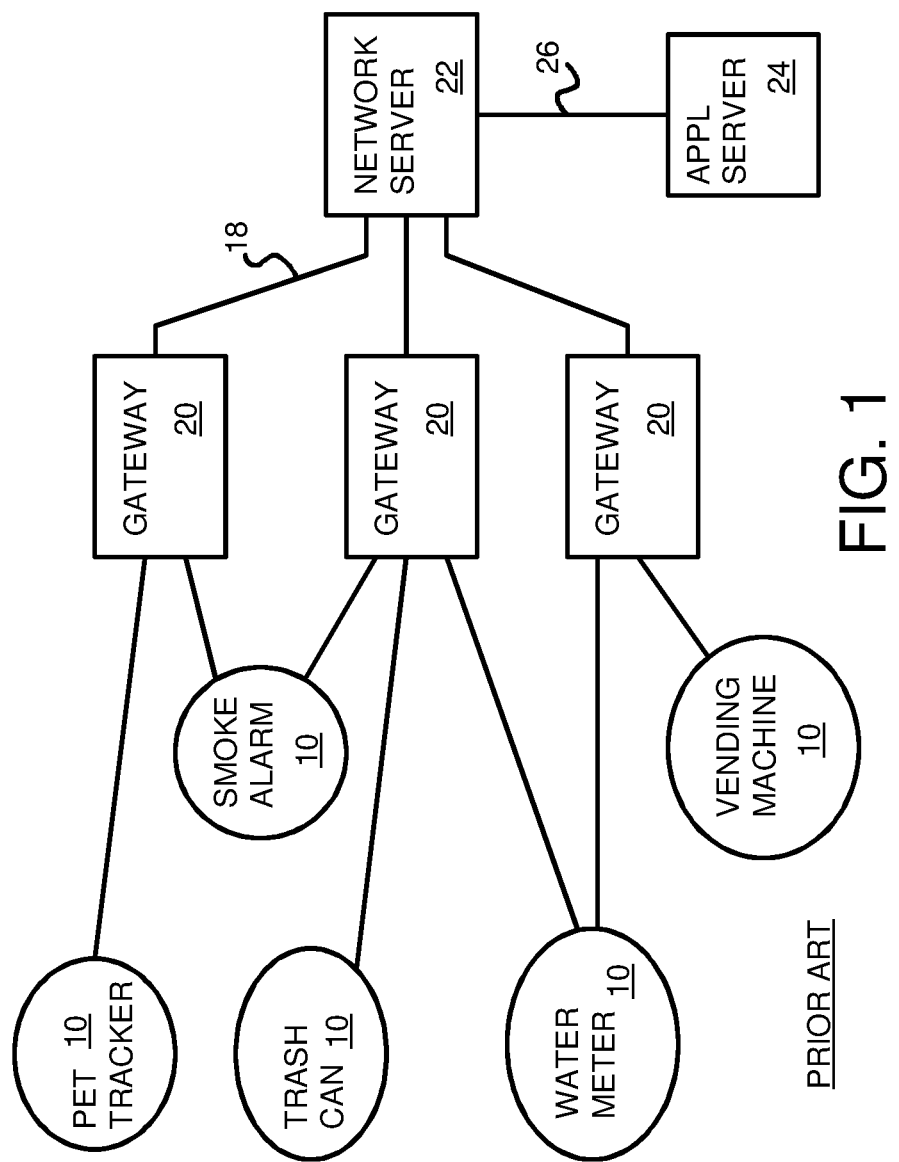
FIG. 1 shows a prior art long-range network.
Figure 3:
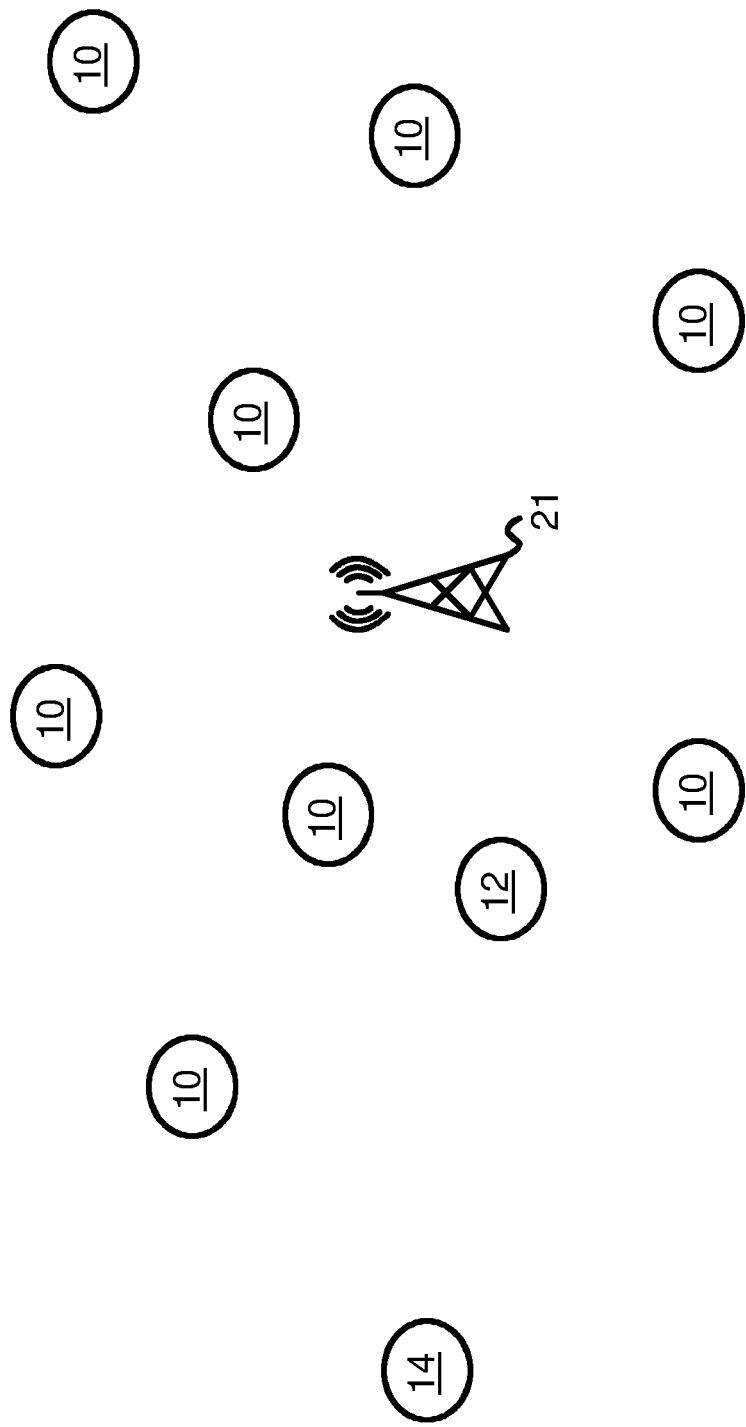
FIG. 3 shows a long range network.
Figure 4:
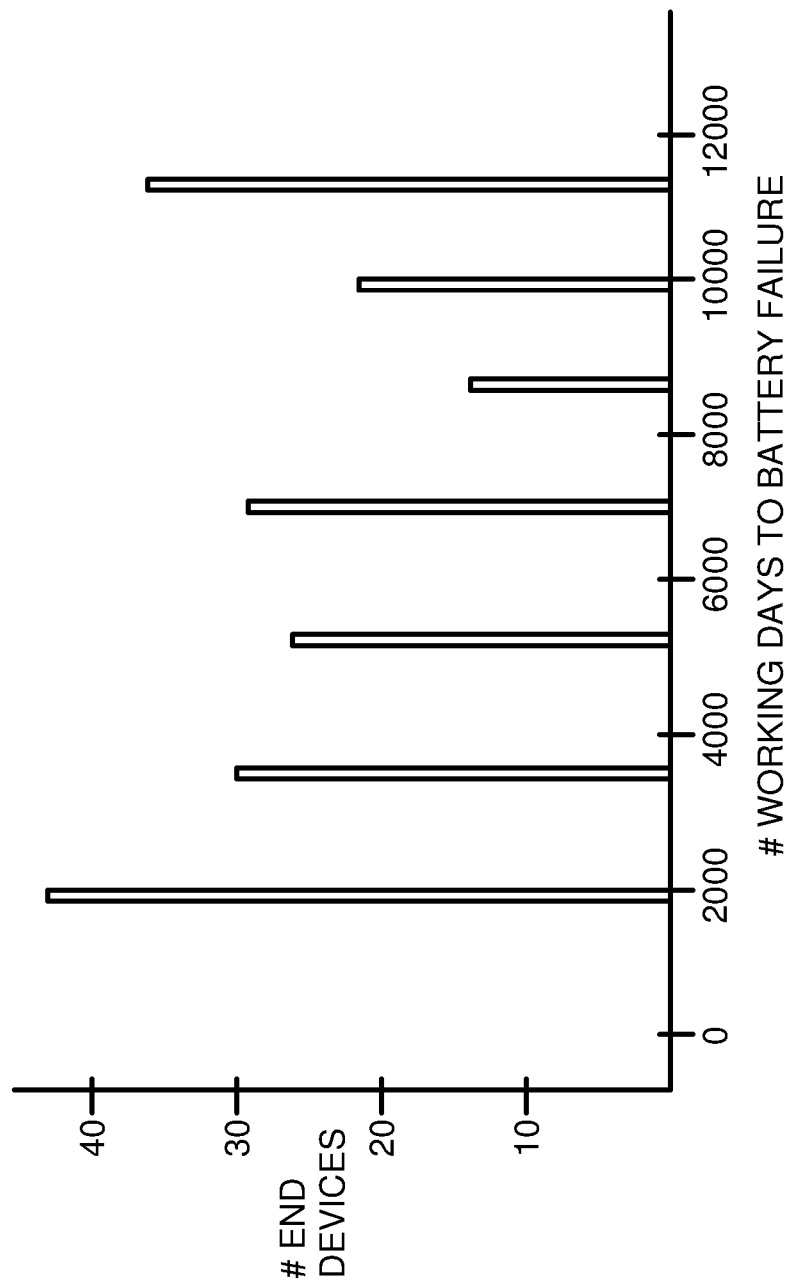
FIG. 4 is a graph of battery lifetime for a long range network.

In comparison to the histogram of FIG. 4, early failures of 2,000 and 3,500 days are eliminated. The worst-case battery lifetime has increased from 2,000 days to 4,600 days by battery load-balancing. The worst-case battery lifetime has more than doubled.

While fewer end devices last to 11,000 days, fewer service calls are needed during the network lifetime, since device lifetimes are more narrowly distributed and multiple end devices can have batteries replaced on a single service call. Overall maintenance costs may be reduced. Early battery failures are eliminated, reducing annoyance of end users. End users may perceive the network to be more reliable since there are fewer early failures.

Figure 7:
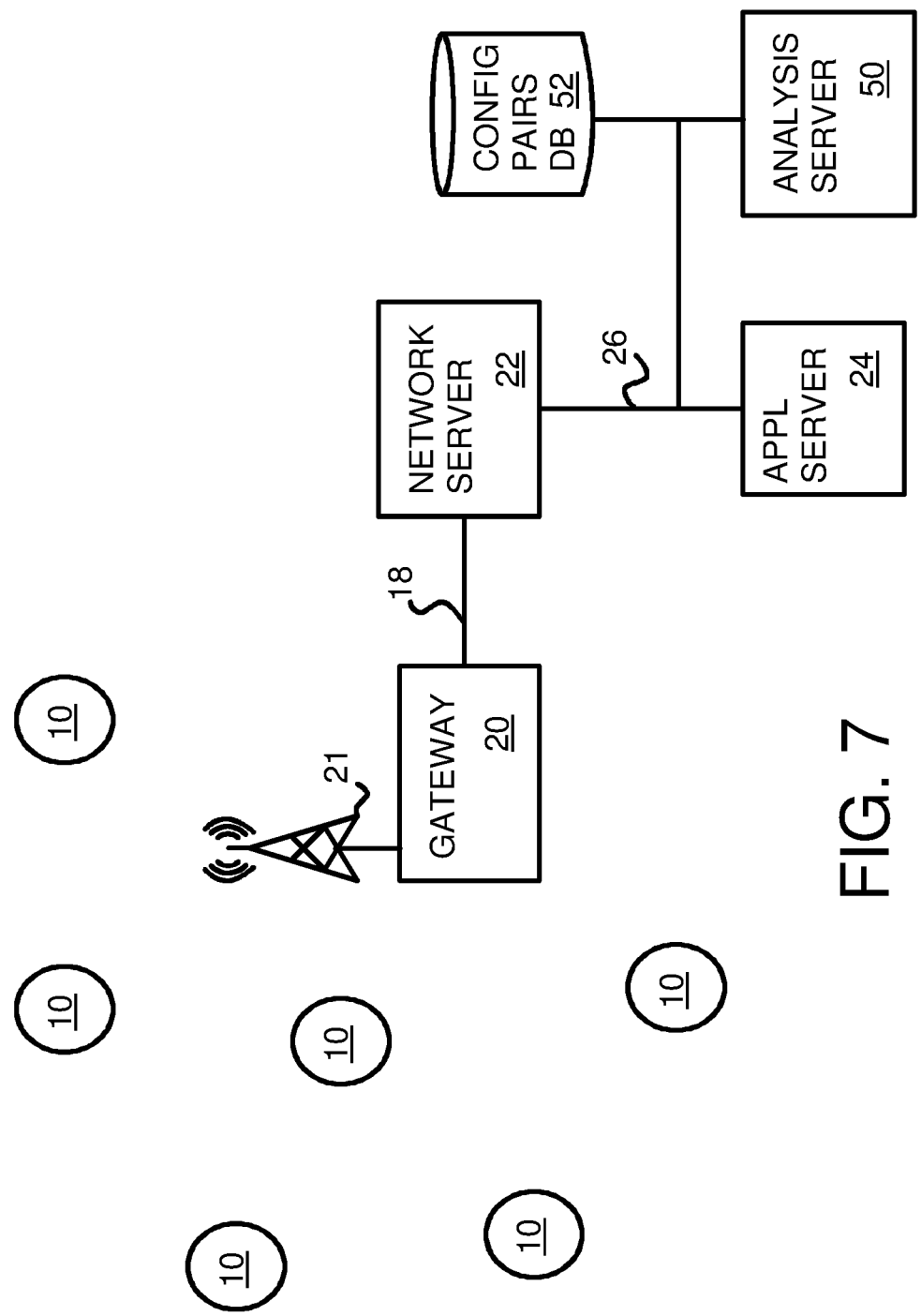
FIG. 7 is a battery-optimizing long-range network with an analysis server for identifying pairs of end devices to share battery energy.

FIG. 7 is a battery-optimizing long-range network with an analysis server for identifying pairs of end devices to share battery energy. End devices 10 send and receive data using RF bit sequences or chirps to gateway antenna 21. Gateway 20 sends data over backhaul network 18 to network server 22. Data is sent from network server 22 as Internet packets over Internet 26 to application server 24. Application server 24 runs network configuration programs including a pairing program to optimize battery usage of end devices 10.

Application server 24 activates analysis server 50 to examine network statistics and generate configuration pairs that are stored as configurations in configuration pair database 52. For example, physical locations and battery levels of end devices 10 can be reported by end devices 10 to application server 24 and stored in a network directory. Analysis server 50 can examine the network directory to estimate energy for transmitting data over paths between pairs of end devices 10, such as short path 32 (FIG. 5), and for transmitting data directly to gateway antenna 21, such as for long path 34 and short path 36 (FIG. 5). Analysis server 50 can then find pairs of end devices 10 that can share battery loads by using a closer end device to relay data from a farther end device in the pair. Once analysis server 50 finds a pair, new configurations for the end devices in the pair are stored in configuration pair database 52.

FIG. 8 shows entries in a network directory. There can be thousands of entries in the network directory when there are thousands of end devices 10. Only 2 entries are shown in FIG. 8, for end device 14 (first row), and for end device 12 (second row).

The first row is an entry for end device 14, identified as D14, which has a data rate configuration set for SF10/125 kHz, which is data rate 2 in FIG. 2. The entry also stores the energy used to send a fixed amount of data to gateway antenna 21 from end device 14, which is 1 mWh. This can be an estimated energy or could be a measured energy. When end device 14 is transmitting with a certain data rate, the energy can be calculated (measured power×time), where time is the payload length divided by the data rate (bps) of the configuration. When setting up a new pair, the energy is estimated based on the distance of the end devices or other environmental factor (e.g. obstacles).

The geographic location of end device 14 is pre-registered to the system during setup. The geographic location can also be reported by end device 14 upon device setup and stored as its latitude, longitude, and altitude. End device 14 can also report its current battery level, 30%, for storage in the network directory.

The second row in the network directory for end device 12 shows that data rate 5 (FIG. 2) is selected, or SF7/250 kHz. This is a higher data rate than for end device 14, and the energy required to send data is lower, at only 0.1 mWh. The battery level of end device 12 is much higher, at 80%, likely because much less energy is used to send data to gateway 20 by end device 12 (0.1 mWh) than by end device 14 (1 mWh).

FIG. 9 shows entries in the configuration pair database. Analysis server 50 has grouped end device 12 and end device 14 together as the first pair, shown in the first row in FIG. 9. The pair ID assigned is P1, with end device 12 (D12) as the relayer and end device 14 (D14) as the reducer. The reducer has reduced battery consumption because the relayer end device forwards the data to gateway 20, reducing the path length from the reducer.

Analysis server 50 also adjusts the data rate configuration for the reducer end device. In FIG. 8, the configuration for end device 14 was SF12/125 kHz, and this old configuration and the energy used, 1 mWh, is stored for pair P1. Since short path 32 to the relayer, end device 12, is shorter than long path 34 (FIG. 5) to gateway antenna 21, a faster data rate configuration may be used. Analysis server 50 sets the new configuration for reducer end device 14 as SF10/125 kHz, and analysis server 50 writes this new configuration into configuration pair database 52. Analysis server 50 estimates that the energy for short path 32 is 0.25 mWh while the energy for long path 34 is 1.0 mWh, and these estimated energies may also be written into the entry for pair P1 along with the new and old configurations. Thus pair P1 reduces energy consumption for reducer end device 14 from 1.0 to 0.25 mWh, a reduction of 75% or 0.75 mWh. The battery life of reducer end device 14 should be increased by as much as a factor of 4 due to pairing.

The second row of configuration pair database 52 shown in FIG. 9 is for pair P2, with end device D57 acting as the relayer for end device D88 that is the reducer. The energy consumption for the reducer is reduced from 0.8 to 0.1 mWh for the predetermined data amount, significantly extending the battery life of reducer end device D88. The new and old configurations for reducer D88 are stored in this second row.

The new configuration for reducer end device 14 can be read from configuration pair database 52 and sent through gateway 20 to end device 14, along with a command to update its configuration. Network server 22 could read each of the new configurations from configuration pair database 52 and write them through gateway 20 to their respective end devices 10. The configurations for the relayer end devices can be updated to instruct them to function as relayers, to wake up at the same time that the reducer wakes up, and to listen for data from the reducer end device in their assigned pair, and forward this data to gateway 20 along with its local data.

In Pair P1, reducer end device 14 will use less battery energy, while relayer end device 12 will use more battery energy. The energy load on the batteries is shared and re-distributed across end devices 12, 14. Likewise, reducer end device D88 uses less energy while relayer end device D57 uses more energy. The overall result is fewer early battery failures in the network.

Figure 10A:
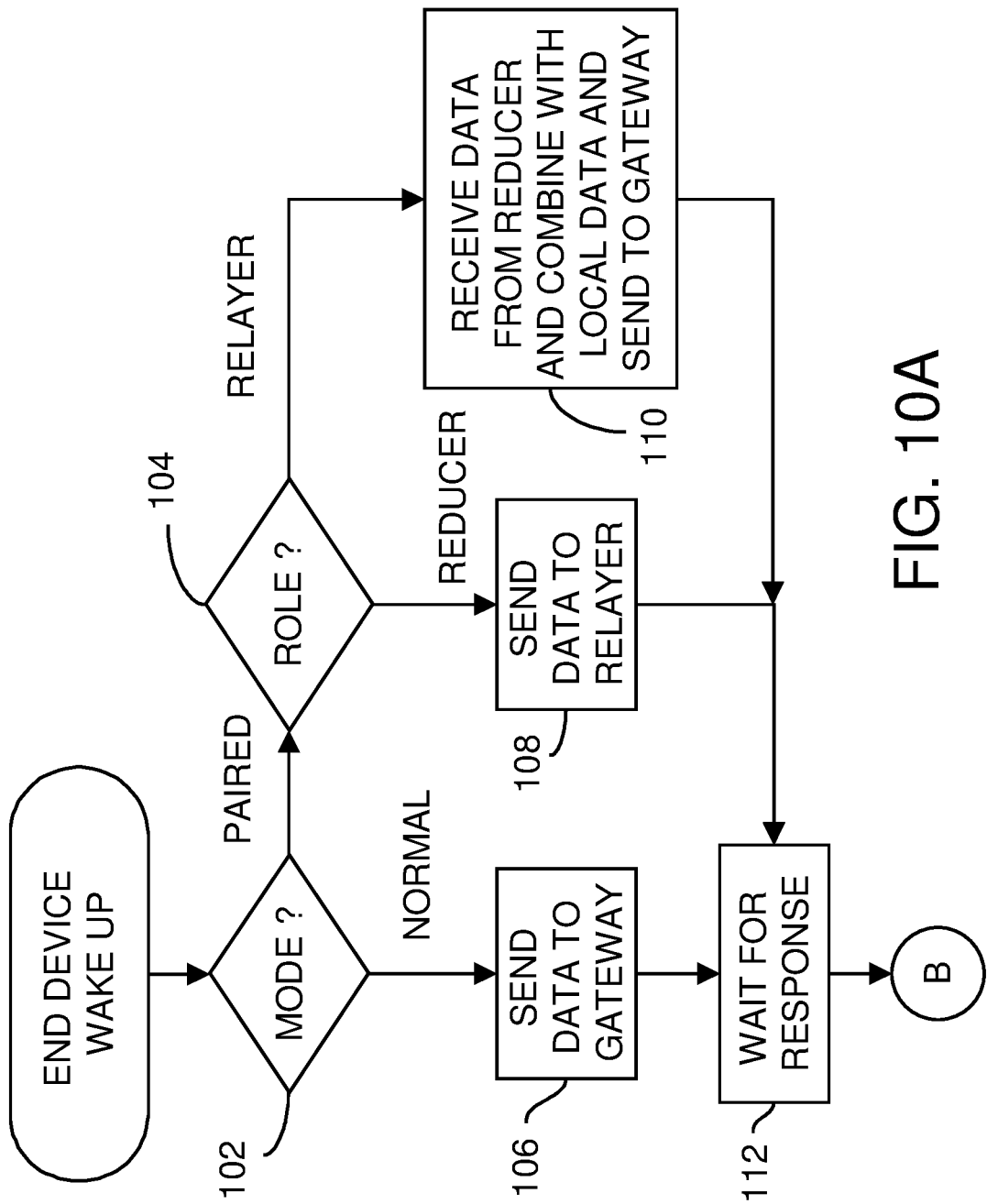

FIGS. 10A-10B show a flowchart of operation of end devices. In FIG. 10A, the end device wakes up when a pre-determined or pre-programmed time elapses or a target time is reached. The mode of the end device is checked, step 102, such as by reading a mode register that can be programmed by network server 22, application server 24, or analysis server 50, through gateway 20 to be in the normal state or the paired state.

When the end device is in the normal mode, step 102, the end device is not paired but acts as a stand-along end device. Data from the end device, such as status data, is sent to gateway 20 from the end device, step 106, and the end device waits for a response from gateway 20, step 112.

When the end device is in the paired mode, step 102, the end device is paired. A role flag or register on the end device is read, step 104, to indicate whether the end device is the reducer end device that is reducing its battery drain, or the relayer end device that relays data from another end device and thus uses more battery energy.

When the role flag indicates reducer, step 104, the end device is the reducer, and it wirelessly sends its data to the relayer, step 108. The reducer end device then waits for a response from the relayer, step 112.

When the role flag indicates relayer, step 104, the relayer end device listens for data sent from the reducer end device. Once the reducer data is received by the relayer, the relayer combines its own data with the data from the reducer and sends data from both end devices to the gateway, step 110. Data may be combined in various ways, such as by having a delimiter symbol indicating the start of the reducer data at the end of the relayer's data. The relayer end device then waits for a response from the gateway, step 112.

Once a response is received from the relayer, for a reducer end device, or from the gateway for other end device modes/roles, step 112, the process continues in FIG. 10B. When the response includes a pairing command, step 140, the mode and role registers are updated, step 142, to pairing mode and to either relayer or reducer modes, depending on whether the end device ID matches either the relayer end device ID or the reducer end device ID in the pairing command. The data rate configuration of the reducer is also updated with the new configuration in the pairing command, such as the new data rate configuration in the pair's record in configuration pair database 52 (FIG. 9). This new data rate configuration may have a smaller SF, and thus the reducer end device will require less battery energy to transmit data. The end device can set a wakeup timer and enter sleep mode to reduce power once the registers have been updated and any other tasks completed.

When a pairing command is not received, step 140, but an unpair command is received, step 144, the pair mode bit is cleared and the end device enters normal mode, step 146. When the end device was the relayer, it relays the unpair command to the reducer end device. When the reducer end device receives the unpair command relayed by the relayer end device, it clears its mode bit to enter normal mode, and may update its data rate configuration to the old reducer data rate configuration that was stored in configuration pair database 52 (FIG. 9). The end device can set a wakeup timer and enter sleep mode to reduce power once the registers have been updated and any other tasks completed.

When neither the pair command nor the unpair command is received, steps 140, 144, the end device remains in its current mode/role. The end device can set a wakeup timer and enter sleep mode to reduce power once the registers have been updated and any other tasks completed.

FIG. 11 shows a maintenance loop executed by the analysis server. This loop can be periodically executed, such as once per hour, or once per day, or at some other interval.

This loop could also be executed when network errors rise above an error threshold, or by some other externally triggered event, such as server power-on or reboot.

The battery levels of end device 10 can be reported to network server 22 when the end device sends data to gateway 20. These battery levels can be stored in a network directory (FIG. 8) or in some other database that can be read by analysis server 50, step 152. Analysis server 50 executes pairing routine 200 (FIG. 12A-12B) to find new pairs of end devices, based on the battery levels and other criteria.

When pairing routine 200 has created a new pair, step 162, a pair command is generated and sent to the two end devices in the new pair, step 164. This pair command can include identifiers of the reducer and relayer end devices, and the new data rate configuration for the reducer. Analysis server 50 may send the pair command or similar message to network server 22 or application server 24 that then dispatches the pair command to the end devices through gateway 20.

Pairing routine 200 or other routines (not shown) may detect an existing pair that is no longer workable, or has been deleted from configuration pair database 52. For example, the geographic location of one of the end devices may have changed, such as when the end device is moved. A new obstacle may have been placed between the end devices that causes wireless transmission errors. The battery level of the relayer may have dropped and is now too close to the battery level of the reducer. The end device may have failed for various reasons.

When an unworkable pair is detected, step 166, an unpair command is generated and sent to the end devices in the pair, step 168. The unpair command may be sent to only the relayer end device, and the relayer end device forwards the unpair command to the reducer end device. The unpair command may include identifiers of the end devices in the pair, and the old data rate configuration of the reducer end device (FIG. 9).

Once all new pairs and all unworkable pairs have been processed, or when neither new pairs nor unworkable pairs are detected, steps 162, 166, analysis server 50 can loop back to step 152 and wait a period of time before executing pairing routine 200 again.

Figure 12A:
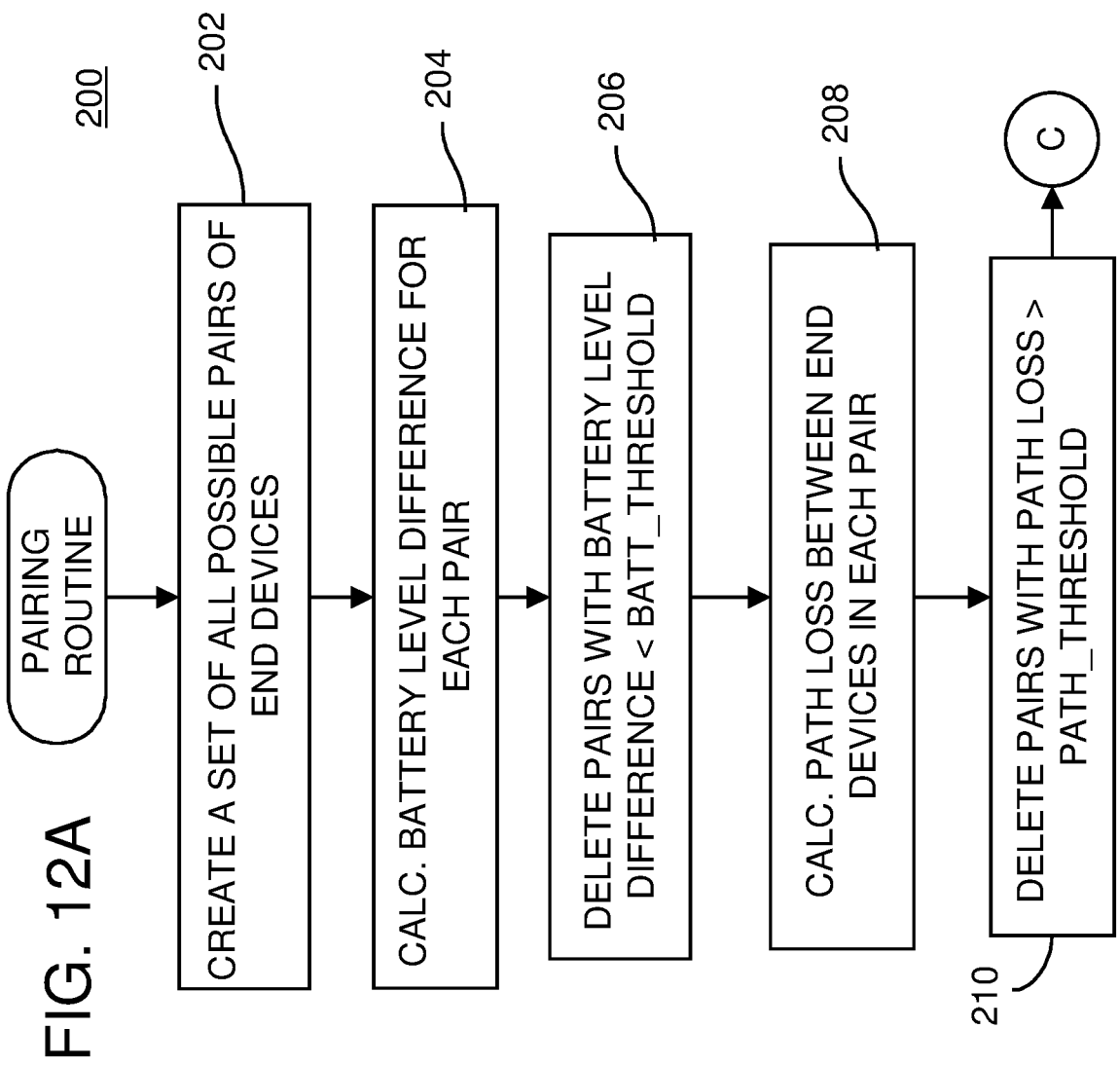
FIGS. 12A-12B show a pairing routine to detect new pairs of end devices for battery energy sharing.
Figure 12B:
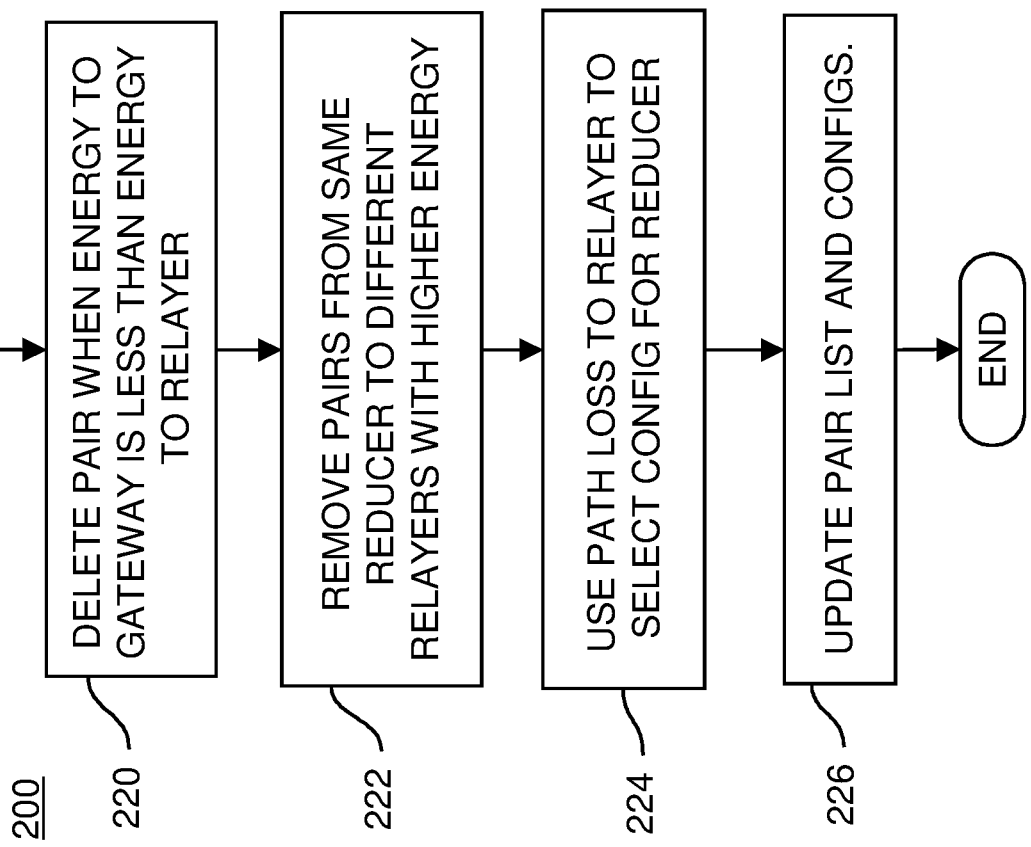

FIGS. 12A-12B show a pairing routine to detect new pairs of end devices for battery energy sharing. Pairing routine 200 can execute on analysis server 50 and access configuration pair database 52 (FIG. 7). A list of all possible pairs of end devices is generated, step 202. The battery level of each end device is read, such as from the network directory (FIG. 8), and the battery level difference for each pair is calculated, step 204. Pairs having a battery level difference that is less than a battery difference threshold are deleted from further consideration, step 206. For example, only pairs with a difference in battery levels of at least 20% may be considered using a 20% battery difference threshold. When the battery levels are too close together, there is not much to gain by pairing.

The path loss between end devices in each pair is calculated, step 208. This path loss can be generated by analysis server 50 using a 3D model of the terrain and any buildings in the geographic area around gateway 20. The geographic location of each end device is registered to the system at setup, or may be reported by the end device upon end device setup, or when moved. The geographic location includes latitude, longitude, and altitude. The altitude can be especially useful in urban areas to estimate the number of floors between end devices in a building.

In rural areas, the RF transmission path loss can be estimated from the latitude and longitude differences between the two end devices. A model such as the Egli pathloss model can be used when there is a clear line-of-sight as is common in outdoor open spaces. For urban areas, an additional loss can be added to account for walls and floors of buildings or other structures. Many refinements or approximations to the path loss estimate are possible.

Pairs of end devices having an estimated path loss that is greater than a path-loss threshold are deleted from further consideration, step 210. End device pairs having low estimated path loss are likely to be closer together than pairs with high losses. Pairs with a high estimated path loss are likely to require a high energy to communicate with each other.

In FIG. 12B, the estimated path losses may be used to estimate the energy required to send data between the end devices in a pair. The energy required to send data from each end device to its nearest gateway can be read from the network directory (FIG. 8), where the energy is stored for the current data rate configuration. The end device with the larger energy to transmit to the gateway can be designated as the reducer end device while the end device with the smaller energy to transmit to the gateway can be designated the relayer end device in the pair.

The estimated energy to transit between the pair devices can be compared to the energy to transmit from the reducer end device to it's nearest gateway. Pairs that require more energy to transmit data between the two end devices than the energy to send data directly to the gateway from the reducer end device can be removed, step 220, because pairing would not reduce energy consumption of the reducer end device.

Then all pairs having a particular end device as the reducer are evaluated by removing pairs with higher estimated energy to various relayer end devices, step 222. Thus for each relayer end device, the pair with the smallest estimated energy is selected by step 222, and pairs with higher estimated energy are discarded.

The best data rate configuration for the reducer end device for each remaining pair is generated, step 224. The estimated path loss from the reducer end device to the relayer end device can be used to select from among the possible data rate configurations, such as by using the table of FIG. 13.

Once the new configuration for the reducer end device is generated, a new entry in configuration pair database 52 (FIG. 9) can be generated and written, step 226. This new entry can be assigned a pair identifier, and the new entry written with identifiers for the reducer and relayer end devices in the new pair, the new data rate configuration for the reducer from step 224, and the estimated energy between the end devices in the pair based on the path loss from step 208. The reducer end device's old configuration and energy to transmit to the gateway can also be stored in the new entry for the new pair.

FIG. 13 is a table for selecting a new data rate configuration for the reducer end device based on the path loss between the reducer and relayer end devices in a new pair. Most configurations are identified by a Spreading Factor (SF) and a bandwidth. Data Rate 5 and Data Rate 6 use the same SF but different bandwidths to achieve different bit rates.

The new data rate configuration can be found using FIG. 13 and the following procedure with these definitions:

N: Noise margin, measured in dB, is the ratio by which the signal exceeds the minimum acceptable amount by the receiver, i.e. receiver sensitivity.

Receiver Sensitivity: A measure of the minimum signal strength that a receiver can discern.

Gt: Transmitter antenna gain, the amount of signal gain provided by the antennas.

Gr: Receiver antenna gain, the amount of signal gain provided by the antennas.

Pt: transmit power, The power that is broadcast by the transmitter. This is usually measured in watts or milliwatts.

The received power can be calculated as (Eqn. 1):

ReceivedPower=Pt+Gt+Gr−Path Losses (PL_line_of_sight+PL_obstacle)

Egli's model is a terrain model for radio frequency propagation. It predicts the total path loss for point-to-point link (line of sight transmission).

Case 1: Line of sight: the distance of each pair of end devices can be calculated from the end device geographic location, loss can be found using Egli's model equation.

Case 2: With Obstacle: the path loss is based on the Environment Factor (kind of obstacle: wall, glass, etc.) and can be estimated by analysis with the help of a 3D model of the terrain and any buildings in the geographic area around the gateway.

In both cases, Path Losses can be estimated using Egli's model and adjusted for obstacles. Using the known Pt, Gt, Gr of end devices 10, the Received Power can be estimated using Eqn. 1.

The receiver sensitivity S in dBm can be calculated using Eqn. 2:

$$S = -174 + 10\log_{10} BW + NF + SNR$$

where BW is the bandwidth, NF is the Noise Figure of the receiver in dB, and SNR is the Signal-to-Noise Ratio from the table of FIG. 13 (SNR Limit) as a function of the SF. FIG. 13 shows a table of Receiver Sensitivity and Data Rate (DR) that are based on LoRaWAN regional standard AS923.

From the Reviver Sensitivity S calculated above, a suitable Data Rate (DR) can be obtained by the algorithm below. Using a higher data rate will require less transmission time for the same payload length, hence less energy. Therefore, in case more than one data rate can provide the required receiver sensitivity, i.e., the estimated received power is larger than the receiver sensitivity, the higher data rate should be selected to save energy. In the routine below, N is the Noise margin, measured in dB, which is the ratio by which the signal exceeds the minimum acceptable amount by the receiver. S_6 is the Sensitivity value of DR 6, S_5 is the Sensitivity value for DR 5, etc.

If ReceivedPower>(S_6+N): DR 6 is used
Else if ReceivedPower>(S_5+N): DR 5 is used
. . .
Else if ReceivedPower>(S_0+N): DR 0 is used.
If there exists a Path Losses Value such that ReceivedPower=S_0, the Path Losses Value is the Path Loss Threshold.

Else No Data rate can be used. This is the case when Path Loss>Path Loss

Threshold.

For a known Data Rate, the amount of Data to send, and the power of Transmission, Reception, Sleep, Data Acquisition:

Data Rate: X bits/second
Amount of Data to send: Y bits
Time=Y/X
Transmission Energy=Transmission Power×Time
Reception Energy=Reception Power×Time
Sleep Energy=Energy used in sleep Data Acquisition Energy=Energy used by the end device to come up with the data to transmit Total Energy=Transmission Energy+Reception Energy+Sleep Energy+Data Acquisition Energy.

FIG. 14 is an alternate table for selecting a new data rate configuration for the reducer end device based on the affordable path loss between the reducer and relayer end devices in a new pair. Rather than select a Data Rate (DR) configuration based on the receiver sensitivity, the affordable path loss can be used and compared to the estimated path loss. The affordable path loss is pre-computed as described below and added to FIG. 14.

ReceivedPower=Pt+Gt+Gr−Path Losses (PL_line_of_sight+PL_obstacle)

Noise margin (N): the ratio by which the signal exceeds the minimum acceptable amount (i.e. sensitivity). It is normally measured in decibels.

So Received power=noise margin (N)+Sensitivity
Pt+Gt+Gr−Path Losses=noise margin (N)+Sensitivity
Pt+Gt+Gr−Path Losses=N+Sensitivity
Path Losses=Gt+Gr+Pt−N−Sensitivity Different configurations of Data Rate (DR) will need different sensitivity levels, and will have different affordable path losses.

Assuming the gain, transmitter power, noise margin, antenna height as before,

Gt, Gr=6 dB
Pt=14 dBm
N=5 dB
Affordable Path Losses=21−Sensitivity

Using a higher data rate requires less transmission time for the same payload length, hence less energy. Therefore, in case more than one data rate can provide the required estimated path loss, i.e., the estimated path loss (PL_line_of_sight+PL_obstacle) is smaller than the affordable path loss, the higher data rate (DR) configuration should be selected to save energy.

ALTERNATE EMBODIMENTS

Several other embodiments are contemplated by the inventors. For example, end devices may have various forms and alternatives, such as having combinations of processors, local memory, RF transceivers, sensors, I/O devices, etc. End devices may have location sensors such as GPS or that triangulate RF signals. GPS coordinates could be detected by another device, such as a cell phone that is linked to an end device to set up the end device, with the GPS coordinates obtained by the cell phone and sent to the end device.

While waking up end devices 12, 14 at the same time has been described, one end device could be awaken before the other and remain awake until the other end device wakes up and data can be both transmitted and received. The wake-up times could differ slightly while the awoken periods of the two end devices overlap.

The records in configuration pair database 52 can be linked, split, or arranged in many ways. Additional information may be stored, such as wakeup time, frequencies or channels to use, error counts or statistics, an identifier of the closest gateway 20 to the relayer end device, age of the end device, etc. Many formats and arrangements are possible for configuration pair database 52 and for the network directory, such as using linked lists or linked records, dispersed or redundant records, directories, sub-directories, files, and flat structures, as a few of many examples.

Functions may be divided or partitioned among servers or other hardware in a variety of ways. For example, application server 24 could be part of network server 22 or could be remote, configuration pair database 52 could be part of analysis server 50 or part of network server 22 or located at a database server. Servers may have multiple processors and storage devices and be multi-threaded and able to execute several programs stored on a disk and copied to a local memory for each processor. Servers may also have or use several physical server machines, even at different physical locations such as being replicated at several server farms. One physical server machine could be partitioned or time-shared and able to operate or function as several different kinds of servers.

The mode and role registers in an end device could be combined. For example, 00 could be normal mode, 01 could be paired mode, reducer role, 11 could be paired mode, relayer role. Many programmable register and flag arrangements and formats are possible.

For an unpair command, rather than reading the old data rate configuration of the reducer end device (FIG. 9) from configuration pair database 52, analysis server 50 could generate a new data rate configuration for the reducer. A default worst-case data rate configuration could also be sent with the unpair command. Then the old reducer data rate configuration would not have to be stored in configuration pair database 52.

The RF transmission path loss can be estimated in a variety of ways using many different models. A coarse model that is easy to compute could be used for a first pass to eliminate pairs that are very far apart, using a large coarse path-loss threshold. Then a more accurate path loss model could be used on the remaining pairs to get a more accurate path loss estimate. The remaining pairs could be reduced further by comparison of the more accurate path loss estimates with a finer path-loss threshold. More refined models may be used to estimate the energy required for transmission, or path losses may be used rather than energy values. Energy values could be estimates based on the path loss estimates, or may be actual energy values measured by changes in the battery levels before and after data transmission.

The long range wireless network could have various network management systems that operate for various purposes, with the battery-level network manager described herein as just one of several managers or control programs for the long range network. The long-range wireless network manager could be a sub-routine called by a larger network management program to periodically change pairing of end devices to extend worst-case battery lifetimes. Many partitionings and arrangements of processes are possible, and various software modules and programs may be implemented in a variety of ways. Some functions or parts of the programs could be implemented in firmware or hardware rather than by executing a software program, such as to speed up certain functions.

Path loss and energy are related to each other, so that path loss can be substituted for energy, or energy can be substituted for path loss. Factors or components of path loss or of energy could also be used in calculations or stored in configuration pair database 52. Various modifications to path loss or energy calculations and formats for storage may be substituted.

The battery levels reported by the end devices could be absolute levels, estimated levels, consumption rates or amounts since a last update, or other factors relating to an amount of energy stored in a battery. Stored battery levels likewise could be absolute levels, estimates, calculated amounts, rates of depletion, etc. The battery-level threshold can be at least 20%, or can have some other value. Likewise, the path-loss threshold could be set to 158 dB, or to some other value. The path-loss threshold is 158 dB in FIG. 14 under certain assumptions (e.g. Pt=14 dBm, Gt and Gr=6 dB). When the assumptions change, the value changes.

While independent pairs have been described, an end device could serve as a relayer for more than one reducer end device. A relayer end device could also act as a reducer, and pass data to another relayer end device, so that there are several intermediate end devices acting as relayers in a chain of relayers. The network may be re-configured after an event such as a power failure or loss of end devices or a gateway. When an end device is moved, pairing routine 200 may be executed and the end device assigned to a different relayer. For example, a pet tracker end device may have to be paired to a different relayer end device when the animal leaves the home and moves around outdoors. Statistics on how often an end device is re-configured may be useful for adjusting pairing. Other criteria may be used for generating pairs.

FIGS. 4, 6 have shown an example of a rural network where Line-of-Sight (LOS) is possible and there are no obstructions. This is an ideal case. Settings with more obstacles such as urban buildings can be accounted for by using the simple rural LOS model and adding more path loss to account for obstacles. These adjustments may be imprecise. In such urban settings, the obstacles increase transmission losses and transmission energy increases, causing batteries to lose energy more quickly. FIGS. 4 and 6 would show a shift to lower days to batter failure in such urban settings. The improvement in worst-case battery lifetime would be decreased in such urban settings.

FIGS. 2, 13, 14 are based on LoRaWAN regional parameters, with AS923 ISM Band channel frequencies, for use in many Asian countries. Different regions have different data rate configurations. Various extensions or changes to the data rate configurations are possible and may affect calculations and data rate selections.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A long-range wireless network manager comprising:
   a network directory database having records of geographic locations and battery levels of end devices that wirelessly send data to a gateway;
   a configuration pair database storing pair records identifying a reducer end device and a relayer end device, and storing a new configuration of the reducer end device, the new configuration for sending data from the reducer end device to the relayer end device, the new configuration for replacing an old configuration for sending data from the relayer end device directly to the gateway;
   an analysis server that generates potential pairs of end devices wherein a difference of a battery level of the relayer end device minus a battery level of the reducer end device in a potential pair is greater than a battery-level threshold;
   a path-loss estimator that generates an estimated path loss from the reducer end device to the relayer end device for potential pairs, and eliminates potential pairs having the estimated path loss above a path-loss threshold;
   wherein the analysis server for each reducer end device generates a new pair by selecting a potential pair having a lowest estimated path loss to the relayer end device;
   the analysis server generating the new configuration for each new pair by using the estimated path loss from the reducer end device to the relayer end device to select a transmission configuration setting that is adjusted for the estimated path loss from the path-loss estimator, the analysis server writing the new configuration to the configuration pair database along with an identifier for the reducer end device and an identifier for the relayer end device in the new pair; and
   a network server that for each new pair, sends the new configuration to the reducer end device and the identifier of the relayer end device along with a command to send data to the relayer end device, the network server also sending a command to the relayer end device to relay data received from the reducer end device to the gateway along with data from the relayer end device,
   whereby the reducer end device is re-configured to send data through the relayer end device to reduce transmission energy and extend battery life of the reducer end device.

2. The long-range wireless network manager of claim 1 wherein the network directory database stores geographic locations that comprise latitude, longitude, and altitude of the end devices;
   wherein the path-loss estimator increases a value of the estimated path loss as a function of differences in altitude to account for building obstacles in urban areas.

3. The long-range wireless network manager of claim 1 wherein the battery-level threshold is at least 20%.

4. The long-range wireless network manager of claim 1 wherein the analysis server further comprises:
   an unworkable pair detector that detects unworkable pairs of the reducer end device and the relayer end device, the unworkable pair detector detecting an unworkable pair when the battery-level threshold is no longer met by the unworkable pair, or when the estimated path loss for the unworkable pair is no longer the lowest estimated path loss or is below the path-loss threshold;
   wherein the network server sends an unpair command to the relayer end device that is forwarded to the reducer end device of the unworkable pair and an old configuration that causes the reducer end device to send data directly to the gateway using the old configuration, the relayer end device no longer relaying data from the reducer end device after processing the unpair command.

5. The long-range wireless network manager of claim 4 wherein the old configuration is stored in the configuration pair database, the network server reading the old configuration from the configuration pair database when generating the unpair command with the old configuration to send to the reducer end device in the unworkable pair.

6. The long-range wireless network manager of claim 1 wherein the analysis server also stores a new energy with the new configuration in the configuration pair database, the new energy being an estimated energy required to transmit data from the reducer end device to the relayer end device.

7. The long-range wireless network manager of claim 6 wherein the estimated path loss generated by the path-loss estimator is stored in the configuration pair database as the new energy or is used to generate the new energy.

8. The long-range wireless network manager of claim 6 wherein the network directory database further stores the old configuration for sending data from an end device directly to the gateway.

9. The long-range wireless network manager of claim 8 wherein the network directory database further stores an old energy for sending data from an end device directly to the gateway;
   wherein the configuration pair database also stores the old energy for sending data from the reducer end device directly to the gateway.

10. The long-range wireless network manager of claim 9 wherein the analysis server reads the old energy from the network directory database and deletes a potential pair having the old energy for sending data from the reducer end device directly to the gateway is less than a new energy required to transmit data from the reducer end device to the relayer end device.

11. The long-range wireless network manager of claim 10 wherein the gateway comprises a closest gateway to an end device, the closest gateway selected from a plurality of gateways having different geographic locations.

12. The long-range wireless network manager of claim 10 wherein the end devices comprise battery-powered end devices in a Long Range Wide Area Network (LoRaWAN) and wherein data is wirelessly transmitted using Radio Frequency (RF) signals.

13. A method for re-configuring a long-range wireless network to extend worst-case battery lifetime of end devices comprising:
   receiving battery levels of end devices that connect to a gateway using wireless signals;

writing the battery levels of end devices received to a network directory database storing geographic locations and battery levels of end devices;

reading the network directory database of geographic locations and battery levels of end devices;

generating a path loss estimate for a potential pair of end devices using the geographic locations read from the network directory database, and repeating for other potential pairs of the end devices;

eliminating a potential pair having a path loss estimate that is above a path-loss threshold;

generating a battery-level difference for the potential pair from the battery levels read for the potential pair from the network directory database, and eliminating a potential pair having a battery-level difference that is less than a battery-difference threshold;

selecting a new pair for a remote end device from among a plurality of the potential pairs having the remote end device with different end devices acting as a relayer end device for the remote end device, the new pair having a lower path loss estimate than other potential pairs of the remote end device;

generating a new configuration of data transmission from the remote end device to the relayer end device for the new pair, the new configuration have a data rate that is adjusted for the path loss estimate;

writing the new configuration, an identifier of the remote end device, and an identifier of the relayer end device to a record for the new pair in a configuration pair database;

sending a pair command to the relayer end device to configure the relayer end device to wait to receive data from the remote end device and then send the data from the remote end device together with data from the relayer end device to the gateway; and sending a pair command to the remote end device, the pair command causing the remote end device to send data to the relayer end device using the new configuration and not send data directly to the gateway.

14. The method of claim 13 further comprising:

eliminating a potential pair having a path loss estimate that corresponds to a transmission energy that is greater than a transmission energy from the remote end device directly to the gateway.

15. The method of claim 13 further comprising:

storing a transmission energy from an end device to the gateway into the network directory database;

storing into the network directory database an old configuration for data transmission from the end device directly to the gateway.

16. The method of claim 15 further comprising:

writing into the record for the new pair in the configuration pair database a new transmission energy that is an energy estimate based on the path loss estimate when the remote end device transmits data to the relayer end device using the new configuration.

17. The method of claim 13 wherein the geographic locations stored in the network directory database comprises location data and altitude data;

wherein generating the path loss estimate further comprises using a three-dimensional model of terrain and buildings that adjusts the path loss estimate based on the altitude data to increase the path loss estimate for differences in altitude within a multi-story building in an urban area.

18. A wireless-network battery optimizer comprising:

a network directory storing geographic locations and battery levels of end devices that wirelessly send data to a gateway in a wireless network using battery energy;

a configuration pair database storing pair records, wherein each pair record comprises:
 a first identifier for a reducer end device;
 a second identifier for a relayer end device;
 a new configuration of the reducer end device;
wherein the new configuration sets a data rate for sending data from the reducer end device to the relayer end device;

a network analyzer that reads the network directory and writes the configuration pair database, the network analyzer generating potential pairs of end devices wherein a difference of the battery level of the relayer end device minus the battery level of the reducer end device in a potential pair is greater than a battery-level threshold;

path-loss estimator means for generating an estimated path loss from the reducer end device to the relayer end device for potential pairs, wherein the network analyzer eliminates potential pairs having the estimated path loss above a path-loss threshold;

wherein the network analyzer selects a new pair for a reducer end device by selecting a potential pair with the reducer end device that has a lowest estimated path loss to the relayer end device in the new pair;

configuration means for generating the new configuration for each new pair by using the estimated path loss from the reducer end device to the relayer end device to select a transmission configuration setting with a data rate that is adjusted for the estimated path loss from the path-loss estimator means, and for writing the new configuration to the configuration pair database along with an identifier for the reducer end device and an identifier for the relayer end device in the new pair; and network configuration means for sending, for each new pair, the new configuration to the reducer end device and the identifier of the relayer end device along with a command to send data to the relayer end device, and for sending a command to the relayer end device to relay data received from the reducer end device to the gateway along with data from the relayer end device.

19. The wireless-network battery optimizer of claim 18 wherein the new configuration specifies a Spreading Factor (SF), wherein a higher value of the SF is assigned the new pair with a higher estimate path loss to spread transmitted data over a longer time period, and a lower value of the SF is assigned the new pair with a lower estimate path loss to spread transmitted data over a shorter time period to achieve a higher data rate.

20. The wireless-network battery optimizer of claim 18 wherein the wireless network is a Long Range Wide Area Network (LoRaWAN) and wherein data is wirelessly transmitted using Radio Frequency (RF) signals;

wherein at least one pair of a relayer end device and a reducer end device are separated by at least one kilometer.

\* \* \* \* \*